tent [19]

United States Patent [19]

Castelazo et al.

[11] 4,173,598

[45] Nov. 6, 1979

[54] POLYMERIC COMPOSITIONS AND METHODS FOR THEIR PRODUCTION

[76] Inventors: Garbiel G. M. Castelazo; Abraham Quintero; Alejandro Medina; Gilberto Fabila, all of Presidente Mazaryk No. 61, Col. Polanco, Mexico, 5

[21] Appl. No.: 859,146

[22] Filed: Dec. 9, 1977

Related U.S. Application Data

[63] Continuation-in-part of Ser. No. 704,633, Jul. 13, 1976, abandoned.

[51] Int. Cl.$^2$ .............................. C08F 279/02
[52] U.S. Cl. ................................ 428/402; 525/80; 525/83; 525/84; 525/243; 525/261
[58] Field of Search ............................ 260/879

[56] References Cited

U.S. PATENT DOCUMENTS

| | | | |
|---|---|---|---|
| 2,939,852 | 6/1960 | Schmidle | 260/879 |
| 3,427,274 | 2/1969 | Cornell | 260/879 |
| 3,652,483 | 3/1972 | Tanaka | 260/879 |
| 3,671,607 | 6/1972 | Lee | 260/879 |

*Primary Examiner*—Paul R. Michl
*Attorney, Agent, or Firm*—Strauch, Nolan, Neale, Nies & Kurz

[57] ABSTRACT

Processes for making polymeric compositions which have methacrylic and/or acrylic chains grafted onto a copolymerized vinyl diene substrate. The compositions, which are novel, are particularly useful as impact modifiers for polyvinyl chlorides.

7 Claims, No Drawings

POLYMERIC COMPOSITIONS AND METHODS FOR THEIR PRODUCTION

This application is a continuation-in-part of application No. 704,633 filed July 13, 1976, now abandoned.

The present invention relates to novel polymeric compositions having methacrylic and/or acrylic chains grafted onto a vinyl diene substrate and to novel methods for making such polymers.

One important use of our novel compositions is as modifiers to increase the impact resistance of certain thermoplastics which are brittle by nature such as polyvinyl chlorides (PVC).

One of the advantages of the present invention is that our novel impact modifiers are highly compatible with PVC. This is important because, if compatiblity is not attained, the impact modifier does not incorporate in the PVC, and separate layers of polymers are formed. This results in a total loss of the ability of the modifier to increase the impact resistance of the PVC. Incompatibility of the modifier with the PVC also gives an opaque product which has no commercial value.

Since the early attempts to develop transparent impact modifiers, great efforts have been made to obtain products having refractive indexes close to that of PVC since the impact modifiers are elastomers, and PVC is a thermoplastic. Exemplary of these efforts are the processes described in U.S. Pat. Nos. 3,641,209 issued Feb. 8, 1972, to Ott et al; 3,652,483 issued Mar. 28, 1972, to Tanaka et al; U.S. Pat. Nos. 3,671,607 issued June 20, 1972, to Lee; and 3,427,274 issued Feb. 11, 1969, to Cornell.

It has heretofore proven possible to obtain similar refractive indexes only by using slow polymerization rates in the production of these modifiers. Another disadvantage of the prior art processes is that the polymerization reactions must be stopped when the conversion reaches no more than 80% because, if they are continued beyond this level, short polymer chains are formed; and short chains have a bad effect on transparency.

Both the constraint on reaction rates and the requirement that the reaction be stopped at a relatively low conversion rate adversely effect the economics of the prior art processes.

In contrast to the prior art methods, our novel process produces an impact modifier with a refractive index very similar to that of PVC with polymerization rates approximately twice as fast as those conventionally used and with conversions of 96–99.5 percent instead of 80 percent.

The differences between the conventional process and our novel, improved process are summarized in the following table:

TABLE I

|  | TRADITIONAL PROCESSES | THE NEW PROCESS |
|---|---|---|
| Copolymerization time (elastomeric substrate) | 24 to 30 hrs. | 8 to 9 hrs. |
| Copolymerization temperature (elastomeric substrate) | 45 to 60° C. | 65 to 85° C. |
| Conversion | 80 to 85% | 96 to 99.5% |
| Graft reaction time | 5 to 8 hrs. | 4.5 to 7.5 hrs. |
| Graft reaction temperature | 50 to 70° C. | 80 to 95° C. |
| Total polymerization time | 29 to 38 hrs. | 12.5 to 16.5 hrs. |

Another disadvantage of prior art impact modifiers is that they are not capable of increasing the impact resistance to what is considered an optimum level. In contrast, our novel process produces an impact modifier capable of imparting an impact resistance which is from 40 to 90% higher than conventional materials.

One of the very important requisites of impact modifiers for PVC is workability. Low workability results in low productivity and, in addition, imparts undesirable optical properties such as yellowness, black spots, etc. to PVC due to degradation. Satisfactory workability of traditional impact modifiers is attained by using low polymerization rates.

The process of the present invention produces an impact modifier with workability better than conventional products due to its high porosity. This characteristic is also advantageous because additives such as lubricants, stabilizers, etc. can be incorporated in the modifier and thereby added to the PVC when the modifier is blended with the latter. Furthermore, improved workability is obtained even though high polymerization rates are employed in our process because of strict control over the formation of the graft polymer.

Another outstanding feature of our process, attributable to the high reaction rate we employ and to the use of large quantities of cross-linking agents, is that it produces a polymer with very high chemical stability and resistance to organic solvents. Some processes for making polymers resembling ours to some extent such as the one disclosed in the patent to Lee identified above, for example, achieve good chemical stability through the addition of acrylonitrile in the polymerization step. However, this material reduces the transparency of the final product. In the process of the present invention, acrylonitrile is not employed; and a highly transparent product can therefore be obtained.

Traditional methods for making compositions of the same general character as ours such as those described in the aforementioned Tanaka, Lee and Cornell Patents generally include three or even four polymerization steps. Usually, the first step is a copolymerization which produces an elastomeric substrate. Thereafter, in a second step, a graft reaction is carried out on that substrate. The third step consists of another graft reaction using a monomer mixture with a high content of ethylenically unsaturated nitrile monomers (Lee) or a polymethyl methacrylate (Tanaka). In a fourth step (Lee), the then existing polymer is mixed with an elastomeric matrix modified with ethylenically unsaturated nitrile monomers producing the final product that will be used as an impact modifier.

The process of the present invention, in contrast, has only two polymerization steps. The first step is a copolymerization of a linear chain, rubber-forming monomeric diene containing two conjugated unsaturations (preferably butadiene) with an aromatic vinyl monomer such as styrene. The product obtained is an elastomeric substrate. The second step is a grafting reaction of polymer chains of the acrylic and methacrylic ester type onto the substrate. Either type of ester or a mixture of both can be used.

To achieve all the desirable features in the final product in only two steps, we invented new polymerization conditions which result in the vinyl diene copolymer having the required impact characteristics and in the grafting polymerization providing adequate workability and transparency. Besides, as indicated above, we also obtain a high degree of stability without using ethylenically unsaturated nitrile monomers in either polymerization thus avoiding the adverse effects on the optical properties of the product (mainly transparency) resulting from the incorporation of such compounds into the product.

Both of the polymerization steps used in our novel process are carried out in accordance with common practice for emulsion polymerization. Following the second of these steps the graft polymer is first coagulated and then dried. These steps are also carried out in a conventional manner.

The blending of the impact modifier and PVC to obtain a product with high impact resistance, good transparency and high workability is preferably carried out in a Banbury or other intensive type mixer.

Readily available texts which may be consulted for information on carrying out different ones of the steps employed in our novel process include:

"High Polymer Latices" by D. C. Blackley Maclaren and Sons Ltd. London Palmerton Publishing Co., New York Vol. I "Fundamental Principles", 1966

"Manufacture of Plastics" by W. Mayo Smith Reinhold Publishing Corporation, New York, 1964 Cat. 64–22287

"Plastics Materials" by J. A. Brydson D. Van Nostrand Company, Inc.; Princeton, N. J.

"Rubber Technology and Manufacture" by C. M. Blow Butterworths, London, 1971

"Polymer Science" by A. D. Jenkins North Holland Publishing Company Amsterdam, London, 1972

From the foregoing it will be apparent to the reader that one important and primary object of our invention resides in the provision of novel polymeric compositions having a vinyl diene copolymer substrate to which acrylic and/or methacrylic polymers are grafted.

More specific but nevertheless important objects of our invention reside in the provision of polymeric compositions in accord with the preceding object:

which have a high degree of chemical stability;

which are resistant to organic solvents;

which are porous and can therefore be used as carriers to incorporate additives into the materials with which they are mixed.

Another important and primary object of the invention is the provision of polymeric compositions as described in the preceding objection which are superior impact modifiers for polyvinyl chlorides.

Other important but more specific objects of the invention reside in the provision of impact modifiers in accord with the preceding object:

which are capable of imparting greater impact resistance to polyvinyl chlorides than conventional impact modifiers;

which are highly compatible with polyvinyl chlorides;

which have refractive indexes closely approximating those of polyvinyl chlorides, making it possible to produce a material which is transparent as well as impact resistant;

which have a high degree of workability.

Still another important and primary object of the present invention is the provision of novel methods for producing polymeric compositions embodying the principles of the present invention.

Additional important but more specific objects of the invention reside in the provision of methods in accord with the preceding object:

which employ only two polymerization steps to produce the composition:

which employ higher polymerization rates than competing, heretofore proposed processes;

which have higher conversion rates than competing, heretofore proposed processes.

Other important objects and features and additional advantages of our invention will be apparent from the foregoing, from the appended claims, and from the ensuing detailed description and discussion of the invention and preferred embodiments thereof.

We pointed out above that the first step of our novel process involves the formation of an elastomeric substrate by copolymerization of an aromatic vinyl monomer with a linear monomer have two conjugated unsaturations.

The relative amounts of the monomers used in the polymerization are very important as this has a great effect on the properties of the final product. We have found that obtention of the wanted characteristics in the final product requires between 50 and 60% of the linear monomer and between 40 and 50% of the aromatic vinyl monomer.

This composition favors a high polymerization rate as aromatic vinyl monomers typically have a higher polymerization rate than unsaturated linear monomers.

Our preferred substrate compositions differ considerably in this respect from those used in the conventional processes discussed above. The latter typically employ from 70 to 100% of linear monomers with two conjugated unsaturations and from 0 to 30% of an aromatic vinyl monomer.

To increase the polymerization rate even more, a combined effect of two variables is employed. These are:

(a) high polymerization temperatures of 65° to 85° C., compared with the 45°–60° C. temperatures used in traditional processes; and (b) a free radical, preferably alkaline persulphate catalyst with a low decomposition temperature (most preferably potassium persulphate).

The combined effect of a high reaction temperature and a catalyst with a low decomposition temperature make the reaction proceed with extreme rapidity which was one reason for choosing emulsion polymerization for the manufacture of the elastomeric substrate. Another reason for choosing this type of polymerization was that emulsion polymerizations yield desirably high molecular weight products (150,000–200,000) even at high reaction rates.

Using our preferred combination of high polymerization temperatures and a low decomposition temperature catalyst, conversions above 96% are achieved in 8 to 9 hours. Copolymerizations of the character used in the first step of our process usually require between 24 to 30 hours with a conversion of only 80 to 85% in other processes.

Furthermore, because uniform polymerization is attained in our process in spite of the high reaction rates, the formation of short polymer chains and the accompanying degradation in the quality of the polymer do not exist as they do when conversion rates generally in excess of 70–80 percent are attempted in traditional processes.

In blending an impact modifier with polyvinyl chloride, the materials are subjected to shear and thermal stresses. These may cause chain ruptures and other forms of degradation, diminishing the effect of the impact modifier. To avoid this, we add a relatively high quantity of a cross-linking agent to the vinyl and diene monomers in the first, substrate forming, polymerization step. From 0.3 to 1.5 percent of the cross-linking agent based on the combined weight of the vinyl and diene monomers is used. This makes the elastomeric substrate strong enough to withstand the stresses imposed on it in subsequent process steps.

The cross-linking agents suitable for our purposes are those of the aromatic divinyl type with divinylbenzene being preferred. They are chemically similar to the monomers that take part in the reaction, and they impart a high degree of stability to the substrate, making it almost invulnerable to chemicals, oils, solvents, etc. Thus, by using high polymerization temperatures and cross-linking agents, we obtain an elastomeric substrate which is highly resistant to shear and thermal stresses and to chemical attack which makes it very suitable as a base to which other polymer chains can be grafted.

Although it is necessary that the substrate be of high molecular weight, control of the chain size is required. Chain transfer agents are used to control chain size. We preferably employ mercaptans having between 10 and 18 carbon atoms. Descriptions of the use of these compounds for purposes comparable to those for which we employ them are also readily found in the literature.

After the copolymerization has been completed to form the elastomeric substrate, polymer chains of acrylic and/or methacrylic esters are grafted onto the substrate to modify and improve its transparency and workability, while maintaining its high impact resistance. This grafting reaction is also carried out by emulsion polymerization.

One of the main problems in this type of reaction is that acrylic and methacrylic esters tend to form polymers among themselves without grafting onto the substrate.

This tendency is much more acute when polymerization is carried out at high reaction rates.

We have now found, however, that high reaction rates can be employed and efficient grafting nevertheless obtained by dosing the ester or esters and an alkaline persulphate or other appropriate catalyst with a low decomposition temperature into the reaction zone at a constant and relatively slow rate.

Furthermore, we have found that the ratio of elastomeric substrate to monomers taking part in the graft reaction is important and that efficient grafting requires between 3 to 4 parts of elastomeric substrate to one part of the monomers to be grafted.

The use of a low decomposition temperature catalyst and a slow dosing of the monomers makes it possible to employ high reaction temperatures (80°–95°). As a consequence, we obtain good polymeric chain grafting onto the substrate at high reaction rates.

In order to obtain chemical resistance and transparency in the final product, a cross-linking agent of the aromatic divinyl type is also added in this second polymerization step.

Divinyl benzene is again the preferred cross-linking agent. From 0.2 to 0.6% weight percent of cross-linking agent based on the total weight of the acrylic monomer(s) is used.

The most suitable monomers for the grafting reaction, due to their excellent optical qualities, are esters of acrylic and methacrylic acids.

It is very important that the percentage of monomer with respect to the elastomeric substrate available for grafting be adequate.

Also, the relative amounts of monomers if a grafting mixture is used is also extremely important, since a small change in the concentration affects the final properties of the product significantly.

$C_2$–$C_4$ esters of acrylic acid, $C_1$–$C_3$ esters of methacrylic acids and mixtures of such esters can be used. Preferably, we employ a mixture containing from 80 to 90 weight percent methylmethacrylate and from 10 to 20 weight percent butyl acrylate. For these ester mixtures we use substrate-to-ester mixture weight ratios ranging from 3:1 to 4:1.

The dosing time in which the monomers are added to the reaction zone in the second, graft polymerization step is another important parameter in our process. Dosing times of 3.5 to 5.5 hours have been found satisfactory.

To control the molecular weight of the polymer chains grafted onto the elastomeric substrate, chain transfer agents (preferably mercaptans with from 10 to 18 carbon atoms) are added by dosing. Lower molecular weight mercaptans are avoided as they tend to decompose too rapidly to adequately control the molecular weight of the polymer chains.

In this second polymerization step we employ from 0.2 to 0.9 percent of the selected chain transfer agent based on the total ester weight.

The grafting reaction is carried out as follows: the substrate is heated to the reaction temperature (between 80° and 95° C.). Once this temperature is reached acrylic and/or methacrylic acid esters are added by dosing. Dosing of the chain transfer agent and the catalyst is simultaneously started. As indicated above, the dosing is carried out at a constant rate over a period of 3.5 to 5.5 hours.

After dosing is completed, the reaction is continued for 1 to 2 additional hours in order to complete the reaction and to reduce the residual monomers content of the reaction product. This is important because the terpolymer will typically be employed in the manufacture of containers for the food industry, and the presence of significant amounts of unreacted monomers in such containers is undesirable.

At the completion of the second polymerization step the terpolymer is recovered from the emulsion by a conventional coagulation process involving, basically, the addition of a solution of an electrolyte such as NaCl, $MgSO_4$, $H_2SO_4$, etc. to the emulsion to precipitate the polymer which is then filtered and washed.

The polymer so obtained is then processed through a fluidized bed, rotating, or other dryer to eliminate volatile compositions.

The following examples, which are intended to be illustrative and not restrictive, are directed to the preparation of a preferred terpolymer by our novel process and to tests demonstrating the advantages of that terpolymer.

EXAMPLE I

STEP "A"

300 parts of water was added to a reactor followed by 18.5 parts of an emulsifier which was a mixture of fatty acids (stearic, oleic and palmitic) saponified with 300 parts of an aqueous solution of 0.2 molar NaOH. Thereafter 135 parts of styrene and 200 parts of butadiene were added. The temperature was raised to 70° C., and 1.1 parts of potassium persulphate, 1.3 parts of divinyl benzene and 0.5 part of t-dodecyl mercaptan were added. The reaction conditions were maintained for 8 hours.

STEP "B"

The temperature in the reactor was raised to 80° C., and 95 parts of a monomer mixture containing 85% methyl methacrylate and 15% butyl acrylate was added by dosing along with 0.2 part of n-dodecyl mercaptan, 0.4 part of divinyl benzene, and 1% of potassium persulphate in solution. The dosing time was 5.0 hours. Thereafter, the mixture was agitated at 80° C. for another two hours.

This produced a polymeric composition which was recovered from the emulsion by coagulation, filtered, washed, and dried.

EXAMPLE 2

PART "A"

A mixture of the following components was prepared in a Henschel type intensive mixer:

| PVC Resin | 100 | parts |
|---|---|---|
| Tin Stabilizer | 1.75 | " |
| Lubricant | 0.25 | " |
| Antioxidant | 0.20 | " |
| Polymeric Composition of Example 1 | 15.00 | " |

PART "B"

A mixture similar to the one of Part "A" was prepared without the impact modifier.

PART "C"

A third mixture was prepared in the same manner as that of part "A" but using 15 parts of an impact modifier produced by the conventional method (low polymerization rate and relatively low conversion level) instead of the impact modifier of Example 1.

PART "D"

The mixtures prepared as described in parts "A", "B", and "C" were processed separately in a roller mill to reduce their particle size and thereafter pressed at 5000 lb/in² pressure, producing 0.90 mm. thick chips. These chips were subjected to dart impact and transparency tests. The results are shown in Table I in which each numerical entry is an average of 20 readings.

TABLE II

| MIXTURE | DART IMPACT (ft-lb) | TRANSPARENCY (% transmittance) |
|---|---|---|
| Part A (Example 2) | 36.50 | 90% |
| Part B (Example 2) | 2.25 | 93% |
| Part C (Example 2) | 22.00 | 90% |

The foregoing tests show that an impact modifier in accord with the principles of the present invention is capable of providing greater impact resistance than one formulated by the conventional approaches discussed above without any loss in transparency. When it is remembered that reaction and conversion rates are much higher and that fewer polymerization steps are required, the superiority of our invention become obvious.

EXAMPLE III

To demonstrate that our novel polymeric compositions possess a high degree of workability, the mixtures of parts "A" and "C" of Example 2 were processed separately through a bottle making machine. This test also afforded a comparison between laboratory and industrial scale results with regard to the quality of our novel impact modifiers.

The results of the bottle machine tests are shown in the following table:

TABLE III

|  | IMPACT* | TRANSPARENCY | PRODUCTIVITY |
|---|---|---|---|
| Part A, Example 2 Mixture | 15 | good | 9 bottles/min. |
| Part C, Example 2 Mixture | 8 | good | 8 bottles/min. |

*the impact resistance of the bottles was measured as follows: the bottle being tested was filled with water at 20° C. and tightly closed. Thereafter, it was allowed to fall from a height of 1.80 meters, and the number of impacts the bottle withstood before showing a break or rupture in its surface were counted. The impact results shown in Table III are averages of 10 tests.

The tests summarized in Table III show that, by employing our novel impact modifier instead of one of conventional character, polyvinyl chloride bottles with much greater impact resistance and equally good transparency can be made at a higher production rate.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. A process for making a polymeric composition of matter of the terpolymer type, said process having as its only essential steps the steps of: forming an elastomeric substrate by emulsion copolymerization of from 50-60 percent by weight of a rubber-forming, linear, diene monomer and from 40-50 percent by weight of an aromatic vinyl monomer at a temperature in the range of 65°-85° and in the presence of a free radical catalyst, a $C_{10}$-$C_{18}$ mercaptan chain transfer agent, and 0.3-1.5% by weight of an aromatic, divinyl, cross-linking agent until a conversion of at least 95 percent is attained; effecting a graft polymerization of at least one of the group consisting of acrylic and methacrylic polymers on said substrate by dosing said substrate simultaneously at a substantially constant rate with a monomeric constituent consisting of at least one $C_1$-$C_3$ ester of methacrylic or $C_2$-$C_4$ ester of acrylic acid at an ester: substrate ratio of 1:3 to 1:4 and with a chain transfer agent, a catalyst, and a 0.2-0.6% by weight of cross-linking agent, all as aforesaid, the dosing being carried out in emulsion at a temperature in the range of 80° to 95° for a period of 3.5 to 5.5 hours; continuing the reactions for a period of 1 to 2 hours after the dosing is completed; and thereafter recovering the polymer from the emulsion, that being the final step in the making of the composition.

2. The process defined in claim 1 wherein the rubber-forming diene monomer is butadiene and the aromatic vinyl monomer is styrene.

3. The process defined in claim 1 wherein the free radical catalyst is an alkaline persulphate.

4. The process defined in claim 1 in which the monomeric constituent is, by weight percent, from 80 to 90 percent of an alkyl ester of methacrylic acid and from 10 to 20 percent of an alkyl ester of acrylic acid.

5. The process defined in claim 4 in which the alkyl ester of methacrylic acid is methyl methacrylate.

6. The process defined in claim 4 in which the alkyl ester of acrylic acid is butyl acrylate.

7. The process defined in claim 4 in which the alkyl ester of methacrylic acid is methyl methacrylate.

* * * * *